US007389301B1

(12) United States Patent
Mazzagatti et al.

(10) Patent No.: US 7,389,301 B1
(45) Date of Patent: Jun. 17, 2008

(54) DATA AGGREGATION USER INTERFACE AND ANALYTIC ADAPTED FOR A KSTORE

(75) Inventors: Jane Campbell Mazzagatti, Blue Bell, PA (US); Steven L. Rajcan, Glenmoore, PA (US); Robert Buckwalter, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 419 days.

(21) Appl. No.: 11/150,663

(22) Filed: Jun. 10, 2005

(51) Int. Cl.
*G06F 17/00* (2006.01)
(52) U.S. Cl. .................... 707/101; 707/3; 707/102; 707/103 R; 707/104.1
(58) Field of Classification Search .............. 707/3, 707/101, 102, 103 R, 104.1
See application file for complete search history.

(56) References Cited

U.S. PATENT DOCUMENTS

| | | | |
|---|---|---|---|
| 4,286,330 A | 8/1981 | Isaacson | |
| 5,245,337 A | 9/1993 | Bugajski | |
| 5,293,164 A | 3/1994 | Bugajski | |
| 5,592,667 A | 1/1997 | Bugajski | |
| 5,630,125 A | 5/1997 | Zellweger | |
| 5,634,133 A | 5/1997 | Kelley | |
| 5,822,751 A * | 10/1998 | Gray et al. ................. | 707/3 |
| 5,829,004 A | 10/1998 | Au | |
| 5,894,311 A | 4/1999 | Jackson | |
| 5,918,229 A | 6/1999 | Davis et al. | |
| 5,930,805 A | 7/1999 | Marquis | |
| 5,963,965 A | 10/1999 | Vogel | |
| 5,966,709 A | 10/1999 | Zhang | |
| 5,970,490 A * | 10/1999 | Morgenstern ............... | 707/10 |
| 5,978,794 A | 11/1999 | Agrawal et al. | |
| 5,983,232 A | 11/1999 | Zhang | |
| 6,018,734 A | 1/2000 | Zhang | |
| 6,029,170 A | 2/2000 | Garger | |

(Continued)

FOREIGN PATENT DOCUMENTS

EP  0 079 465  1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Shahid Alam
*Assistant Examiner*—Phong Nguyen
(74) *Attorney, Agent, or Firm*—Richard J. Gregson; Robert P. Marley; Susan Murphy

(57) ABSTRACT

Aggregation of data in an interlocking trees datastore, especially when the interlocking datastore is a KStore is described. It details consolidating data into a summary or aggregation so that some particular desired analytic type of operation may easily be performed on the data. It uses a set of data constraints across the entire data set. This redefines the data set, which may be for example, individual receipts granular by week or month. When data is learned into a KStore, aggregation parameters may be collected and these parameters may be used to constrain the dataset recorded in K, and direct performance of an analytic on a particular a field value(s). Additional features and details are provided within.

18 Claims, 8 Drawing Sheets

U.S. PATENT DOCUMENTS

| | | | |
|---|---|---|---|
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1* | 9/2001 | Axaopoulos et al. .......... 707/10 |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1* | 5/2002 | McCrory ..................... 706/47 |
| 6,405,207 | B1* | 6/2002 | Petculescu et al. ......... 707/102 |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1* | 1/2003 | Reed et al. .................... 706/47 |
| 6,505,205 | B1 | 1/2003 | Kothuri et al. |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1* | 10/2003 | Burkett et al. .............. 715/235 |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2* | 7/2004 | Thier et al. ................. 707/100 |
| 6,769,124 | B1 | 7/2004 | Schoening et al. |
| 6,799,184 | B2* | 9/2004 | Bhatt et al. ................. 707/102 |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1* | 10/2002 | Bakalash et al. ........... 707/100 |
| 2002/0188613 | A1 | 12/2002 | Chakraborty et al. |
| 2002/0194173 | A1 | 12/2002 | Bjornson et al. |
| 2003/0009443 | A1* | 1/2003 | Yatviskiy ....................... 707/1 |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2003/0220860 | A1* | 11/2003 | Heytens et al. ............... 705/35 |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1* | 3/2005 | Clark et al. ................. 707/100 |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |
| 2006/0010153 | A1* | 1/2006 | Bugaj .......................... 707/102 |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al: "Multiple Generation Text Files Using Overlaping Tree Structures", Computer Journal, Oxford University Press, Surrey, GB. vol. 28, No. 4 Aug. 1985 , pp. 414-416.

\* cited by examiner

Figure 5.

| Field Group | Field Type | Field Name | Field Value | Attribute Name | Attribute Value |
|---|---|---|---|---|---|
| Area | Field Group | null | East | null | null |
| Area | Field Group | null | South | null | null |

550

| Field Group | Field Type | Field Name | Field Value | Attribute Name | Attribute Value |
|---|---|---|---|---|---|
| East | K | State | NY | null | null |
| East | K | State | NJ | null | null |

555

DATA AGGREGATION USER INTERFACE AND ANALYTIC ADAPTED FOR A KSTORE

BACKGROUND OF THE INVENTION

1. Field of Invention

The present invention relates to computing and in particular to the process in which data within an interlocking tree datastore is aggregated for expression in summary form, for various purposes such as performing distinct counts and statistical analysis.

2. Description of Related Art

Data aggregation is any process in which information is gathered and expressed in a summary form, to facilitate various purposes such as statistical analysis. Data aggregation methods for consolidating large amounts of complex data are fairly common in the art. For example, U.S. Pat. No. 6,768,995, entitled "Real-time aggregation of data within an enterprise planning environment," U.S. Patent Application Publication Nos. 2002/0143783 and 2005/0060325, both entitled "Method of a system for data aggregation employing dimensional hierarchy transformation," and 2003/0009443, entitled "Generic data aggregation" teach methods for aggregating data that is stored in relational databases. The techniques taught in these references include mechanisms to consolidate data as new data sets or within OLAP cubes so that analysis can be performed through scripts and algorithms.

U.S. Pat. No. 6,768,995, entitled "Real-time aggregation of data within an enterprise planning environment," mentioned above, teaches how to divide a database into the relational data area, the transactional data area, and server. The server publishes data from the transactional area to the relational area. The transactional area supports real-time interaction and the relational area allows detailed statistical analysis and report generation.

U.S. Patent Application Publication Nos. 2002/0143783 and 2005/0060325, mentioned above, teach a method of aggregating data having at least one dimension logically organized into multiple hierarchies of items, whereby such multiple hierarchies of items are transformed into a single hierarchy that is functionally equivalent to the multiple hierarchies. In the hierarchy transformation process, a given child item is linked with a parent item in the single hierarchy when no other child item linked to the parent item has a child item in common with the given child item.

U.S. Patent Application Publication No. 2003/0009443, entitled "Generic data aggregation," and also mentioned above, teaches methods, devices for increasing the speed of processing data by filtering, classifying, and generically applying logical functions to the data without data-specific instructions.

The forgoing systems and methods can often produce satisfying results. However, they all appear to use relational databases and methods in attempts to increase the speed of data aggregation. They also appear to teach how to design structures within relational databases that enable the user to separate transactional from relational (stored) data.

The KStore technology addresses many common problems associated with relational databases and the aggregation of data, by modeling that data into a structure with a predefined process that relates all new data to existing data within the interlocking trees datastore model. As described in U.S. patent application Ser. Nos. 10/385,421, entitled "System and method for storing and accessing data in an interlocking trees datastore" published as U.S. Patent Application Publication number 20040181547 on Sep. 16, 2004 and 10/666,382, entitled "System and method for storing and accessing data in an interlocing trees datastore" published as U.S. Patent Application Publication number 20050076011 on Apr. 7, 2005 the KStore data structure does not require any distinction between transactional data and stored (relational) data. A system for efficiently using an interlocking trees datastore as described in the '421 and '382 applications just mentioned was also described in U.S. patent application Ser. No. 10/879,329.

All references cited herein are incorporated herein by reference in their entireties.

BRIEF SUMMARY OF THE INVENTION

This patent teaches a method to aggregate data in an interlocking trees datastore, especially when the interlocking datastore is a KStore. It particularly describes details of consolidating data into a summary or aggregation so that some particular desired analytic type of operation may easily be performed on the data. For example, the daily sales data may be aggregated so as to compute monthly and annual sales total amounts. Data may be summarized at multiple granularities.

The KStore Data Aggregation algorithm uses a set of data constraints across the entire data set. This redefines the data set, which may be for example, individual receipts granular by week or month. When data is learned into a KStore, aggregation parameters may be collected and these parameters may be used to constrain the dataset recorded in K, and direct performance of an analytic on a particular a field value(s).

This invention is unique in that it is the only process currently known that can perform the data aggregation and calculations on the unique interlocking trees datastore of the KStore.

Available relational database data aggregation tools do not support analysis on data recorded within the KStore datastore.

There is no need to design and build additional costly complex structures, as in the previous art, to hold transaction data for real-time interaction, and complex tables and OLAP cubes to hold relational data on which to perform statistical analysis if one is using the KStore technology.

BRIEF DESCRIPTION OF SEVERAL VIEWS OF THE DRAWINGS

The invention will be described in conjunction with the following drawings in which like reference numerals designate like elements and wherein:

FIG. 5 is a graph of a populated conceptual table of data, for use in running a Data Aggregation analytic in accord with a preferred embodiment of the invention.

DETAILED DESCRIPTION OF THE INVENTION

Figure 1:
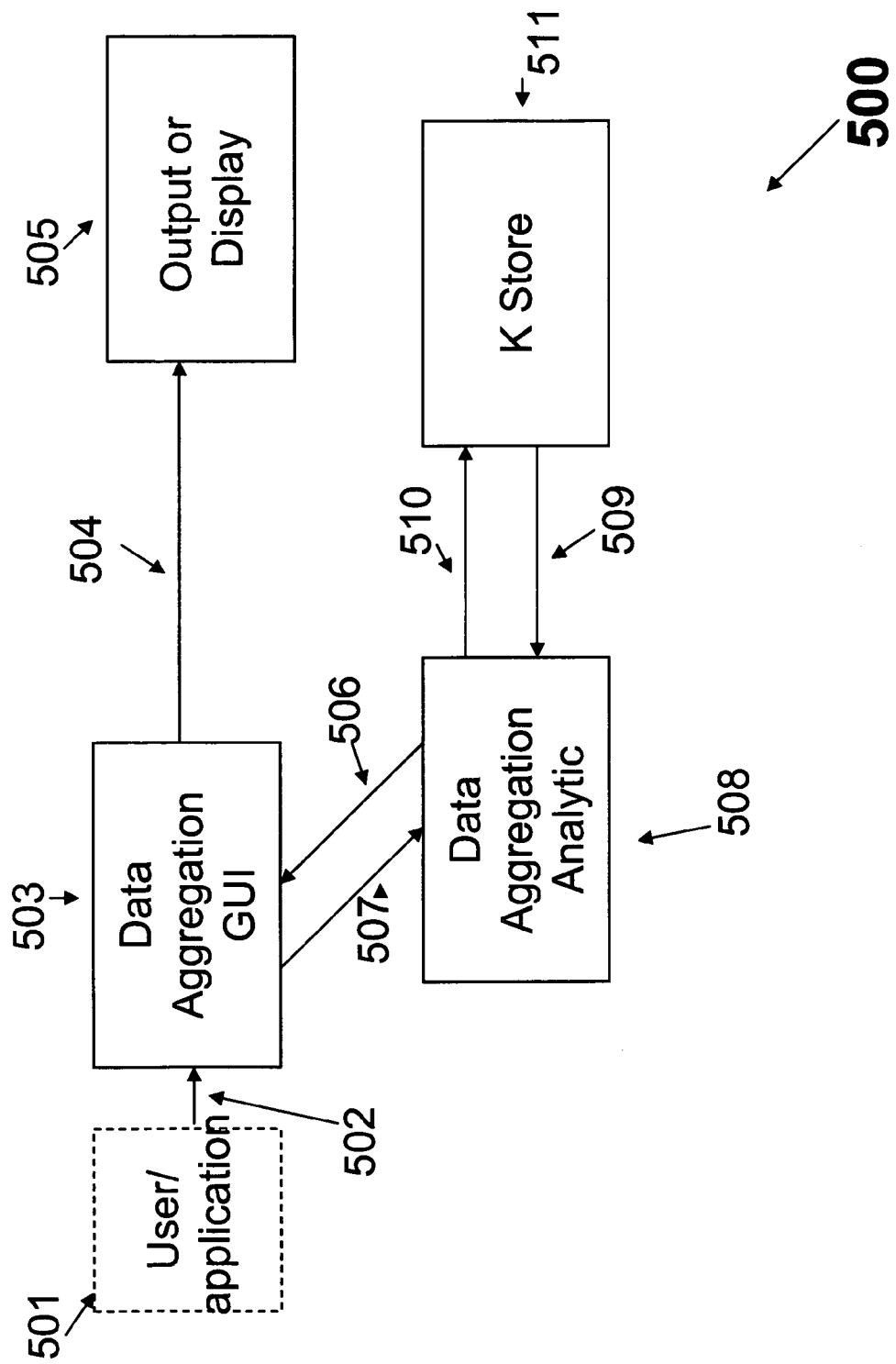
FIG. 1 is a block diagram representation of a Data Aggregation system consistent with a preferred embodiment system.

Because the KStore represents its records in a unique structure unlike that of traditional databases, it requires a matched method to aggregate (summarize) records so that analytics may be performed upon data.

Within this patent, we use the terms "algorithm," "analytic," and "real-time analytic" to mean an organized procedure for evaluating data which may include some visual display, generating a report, performing a given type of calculation for example.

Data aggregation is any process in which information is gathered and expressed in a summary (or aggregated) form, for purposes such as statistical analysis. For example, daily sales data may be aggregated so as to compute monthly or annual total amounts. Likewise, individual components of the data may be used for different aggregations (such as by sales-person or by location) to get different kinds of knowledge from the same data, and the aggregation may be used to assist in generating such information.

Using our invention, data is read into KStore, aggregation parameters are collected or determined either from queries or automatically, and these parameters are used to constrain the dataset and perform an analytic on a particular field(s). The KStore Data Aggregation analytic can find whether there is a co-occurrence of variables sought in a single record and it may also perform numeric calculations on data as identified in user-defined queries. In a preferred embodiment, it performs a summation calculation, but is not limited to that calculation; in other embodiments of the invention, it may perform analytics or calculations, such as averaging, distinct count, distinct count percentage, distinct count ratio, record count, record count percentage, record count ratio, among others.

(A "Distinct Count" analytic for example returns as results, a count of each distinct value in a given data set. With distinct count, duplicates are not counted. Distinct count is used when an exact count is needed. For example, if a sales manager wants to determine the number of items sold by a given salesperson, he would only seek the exact number of each different item sold by that salesperson. Thus, the ID of the salesperson of interest (his name or other indicator) would be the limiting focus for the distinct count).

Other ways to use the data pulled from this process are also accommodated. For example, if a salesperson in the above parenthetical were making sales of fungible goods by weight, adding up the total number of grams sold may be of interest as opposed to a distinct count, and in doing this, one would want to add the actual variables rather than the distinct count of items he sold.

Although we have described in the previously mentioned patent applications a system and method for creating an interlocking trees datastore, which we now call KStore, we feel it necessary to repeat some of the description in order to familiarize the reader with the concepts which the present invention takes for granted as existing technology, but we believe these concepts are found nowhere else in the computer data arts. We also describe the system it is used herein sufficient detail for this disclosure, but such a system was outlined in great detail in U.S. patent application Ser. No. 10/879,329 filed Jun. 29, 2004.

For convenient reference we generally describe the KStore data model structure here, although it can be found in more detail in the above-incorporated patent references. The KStore datastore is composed of multilevel interlocking trees. Construction of each level of the forest of interlocking trees captures information about a data stream by creating new nodes representing sequences of elements from an elemental dataset. The interlocking tree datastore itself generally comprises a first tree that depends from a first root node and may include a plurality of branches. Each of the branches of the first tree ends in a leaf node, which we now call an "end product node." A second root of the same tree-based datastore is linked to each leaf node representing an end product. Finally, the tree-based datastore comprises a plurality of trees in which the root node of each of these trees can be described as an elemental node. The root node of each of these trees may be linked to one or more nodes in one or more branches of the first tree. The nodes of the tree-based datastore contain (mostly) only pointers (usually bidirectional) to other nodes in the tree-based datastore, instead of data per se, and may also contain additional fields wherein one such additional field may be a "count field."

Refer to FIG. 12a of US Patent Application Publication Number 20050076011, also published as related publication WO 2004081710, which defines the specific fields in a generalized node structure. Note that the bi-directional Result links point between a Result field of one node and an asResult list of another node, and the bi-directional Case links point between the Case field of one node and an asCase list of another node In earlier applications we did not distinguish forward looking from backward looking links by terminology. Hence, we may have used Case links or asCase links to refer to links between BOT nodes and the paths of nodes that were on the asCase list indiscriminately. Now, however, we prefer to refer to asCase links as links pointing from the BOT nodes and subcomponent nodes toward their EOT nodes and Case links pointing back toward the BOT node from EOT or subcomponent nodes, thus giving directionality to the terminology. We have adopted similar terminology for asResult and Result links, with the asResult links pointing from the root nodes toward their Results (subcomponent nodes, typically) and Result links pointing back toward their root nodes.

It will be appreciated that the aforementioned relational information is actually recorded within the structure of the interlocking trees datastore that is built, rather than explicitly stored in the subcomponent and end product nodes of the tree. Because only the elemental root nodes of the interlocking trees datastore may include "data" or values, links can be followed back to the root nodes to determine or reconstruct the original data from the data stream from which a KStore is constructed.

Figure 2:
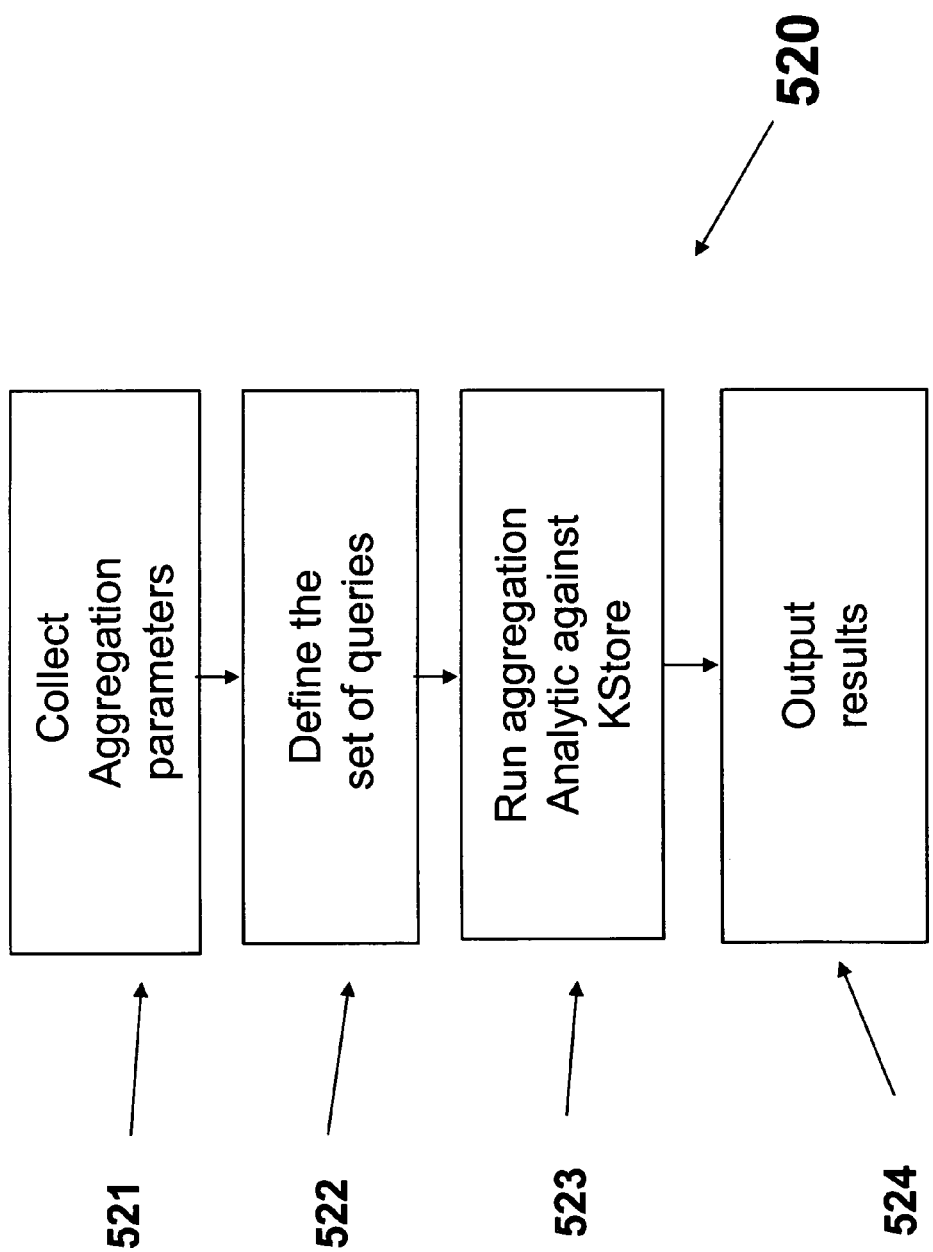
FIG. 2 is a flow chart of data aggregation and summation in accord with preferred embodiments of the invention.

Referring now to FIGS. 1 and 2, there is shown the Data Aggregation system 500 and the process flow 520 of the preferred embodiments of the present invention. The Data Aggregation system 500 permits a user or a background application 501 to query the KStore 511 and to display the results obtained from the KStore 511 on an output display device 505. The Data Aggregation process flow 520 operates within the all of the blocks of the Data Aggregation system 500. It controls transmission of input from the user 501 or background application, obtaining information from the KStore 511 in response to the input and pushing data to an output display device 505.

Generally, if it is a user whose request is being facilitated, the Data Aggregation GUI 503 will be most likely be displayed on the user's computer screen, although any type of interface including at least audio or graphic input is useful for receiving input into the process. The output or display 505 which will convey the results to the user will also be available to the user through a computer interface of some kind. If the request is being done through an application, the component 503 will be an interface for receiving input from the application rather than a user interface, but the activity to which it is put will be analogous. The data aggregation analytic 508 will generally be on the same computer system in which the KStore 511 is present; however, given the nature of networked computing today, this is certainly not a requirement. The channel 506 may have various hardware and/or software components in it, based on the implementation. If this is a network, clearly different protocols would be needed to support this communication channel than if the user is accessing a KStore through a single computer.

Figure 8:
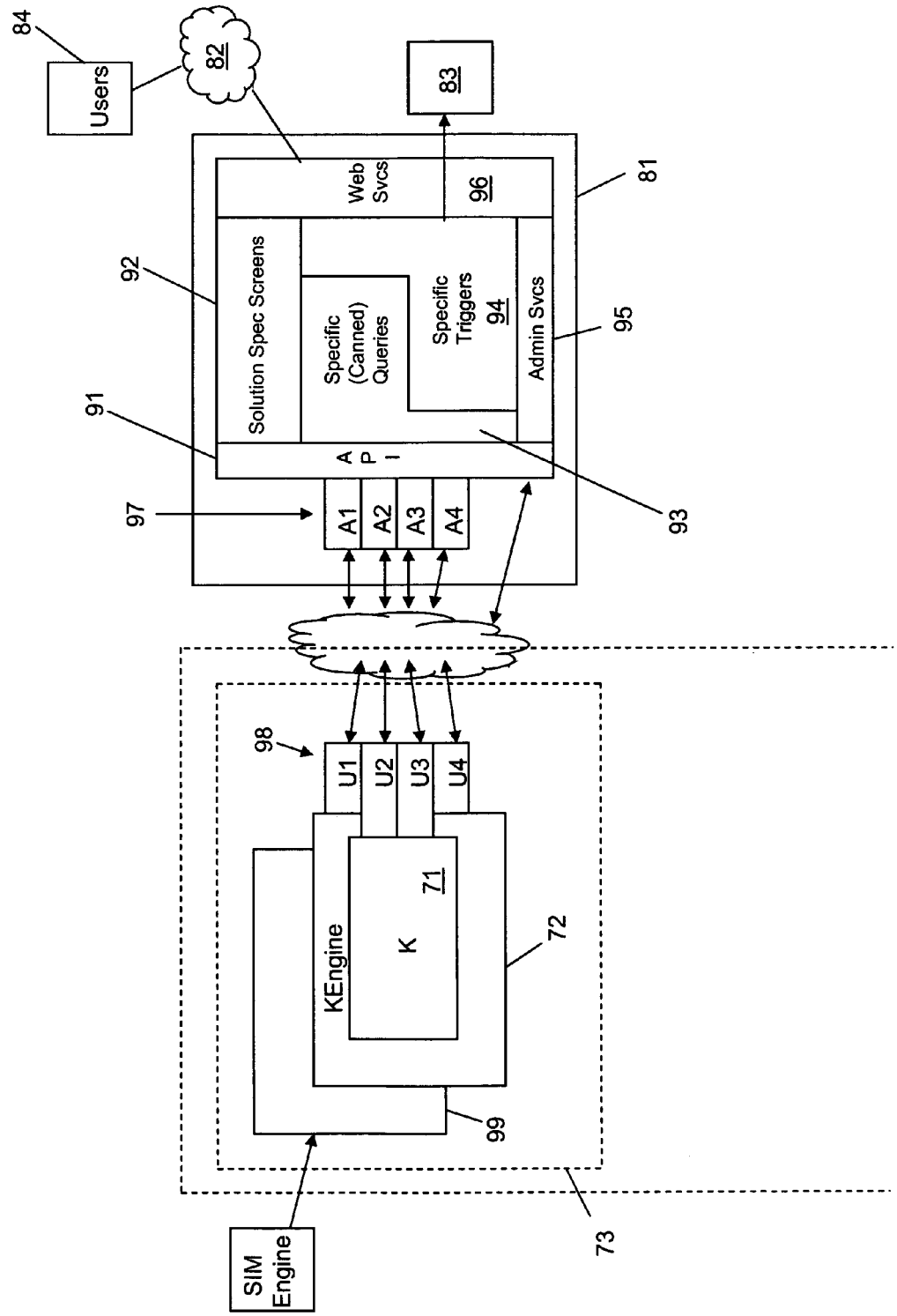
FIG. 8 is a block diagram of a KStore data structure in a working system in accord with preferred embodiments of this invention.

The communications channels 509 and 510 too will be populated with various important and necessary components which are not necessary to discuss here in detail as they are already understood to one who has read and understood our prior published patent applications. For example, a K Engine is generally used to communicate between any application and a KStore. Various other components such a Learn Engines and Query functions can also be within this channel, supporting, formatting, and aiding with their own assigned memories the completion of the task at hand. Refer to FIG. 8 in which a detailed block diagram depicts many of the potential ways in which a K Store can be used and built in accord with preferred embodiments of this invention. Refer specifically to channel elements 81, 97, and parts of 98, which might be used by analytics 97 and all pieces therein.

The KStore 71 is in a server computer system 73. The server can be any kind of general purpose computing system; the ones we have used are multiprocessor systems that allow for multiple partitions. The physical data store 74 can be any kind of data storage system preferably closely tied to or part of a computer system (or server) 73 for convenient access.

The API Utilities are the Utilities portions 98 ($U_1$-$U_n$) that handle the calls to the K Engine and provide the interface to the data stores that track the lists of addresses that may be needed to organize the individual calls to satisfy a query. The segments 97 may be a set of analytic applications that are provided to queries through the API. These queries are selected or constructed either by a user through solution specific screens 92, or directly through any means of access, such as a GUI or other program and the like. There are two types of U portions in the API Utilities. Note that U2 and U3 connect directly to K 71. This is drawn so as to call attention to the functionality in which some few, but generally not all, API Utilities are able to directly access K. API Utility calls to KEngine.

Referring back to FIG. 1. In one preferred embodiment of the invention, the block 503 of the Data Aggregation system 500 may be a conventional user interface (GUI) for receiving and transmitting queries from the user 501, similar to the ones we show in FIGS. 3 and 4, by way of example. We refer conveniently to block 503 as a Data Aggregation GUI 503, even though it should be thought of as an interface for both human users and for applications programs or even for other electronic systems. When a user 501 is using the Data Aggregation system 500, the user 501 can enter queries for the KStore 511 by way of the channel 502 and the GUI 503.

The GUI 503 communicates with the Data Aggregation analytic 508 by way of the bi-directional channel 506, 507 in order to provide input from the user 501 to the analytic 508. The results of the aggregation analytic, an aggregated data set, may be stored or used in different ways. In one preferred embodiment of this invention, the results of the analytic may be displayed on a graphical display device 505. In another embodiment the results may be directed to store the aggregated data set as summary records, which could be produced in some proprietary or other useful or open format such as XML. In yet another, they may be used to create different an entirely new KStore data structure 511 from the summary records. The results could also be held as the (or copies of the) K paths from the original KStore data structure from which the summary record if desired, which itself could be stored in a new KStore structure or other data record format. The input of the user 501 consists of constraints to be used to limit access to only the data of interest from the KStore 511 in order to obtain answers to queries entered and aggregation parameters. The constraints and parameters collected by the analytic block 508 are discussed in more detail below.

Refer to FIG. 2. FIG. 2 shows the process flow of data aggregation and summation 520.

Collect Aggregation Parameters

This step in this process is to collect the data aggregation parameters 521. These will likely be or have been user-defined to constrain the data to only the information that is needed. This patent will explain how data may come into the Data Aggregation user interface and analytic from another KStore application through XML. (eXtensible Markup Language.) XML is a subset of SGML constituting a particular text markup language for interchange of structured data. It should be noted thatwhile this patent explains Data Aggregation using the input via XML, that this is not the only way aggregation parameters can be defined nor transmitted to the Data Aggregation user interface and analytic; this is one method. Programmers versed in other methods could write a program to define the aggregation parameters and to transmit parameters to the analytic.

One type of aggregation parameter is field groups. Field Groups are user-defined groupings of field variables that can be used to associate data that isn't inherently associated within the KStore data structure. Another type of aggregation parameter can be inherent groups in the data, such as field names to field values. Depending on what information the user (or program or system) may want from the data, the user (or program or system) will select such groupings that may be appropriate.

Figure 7:
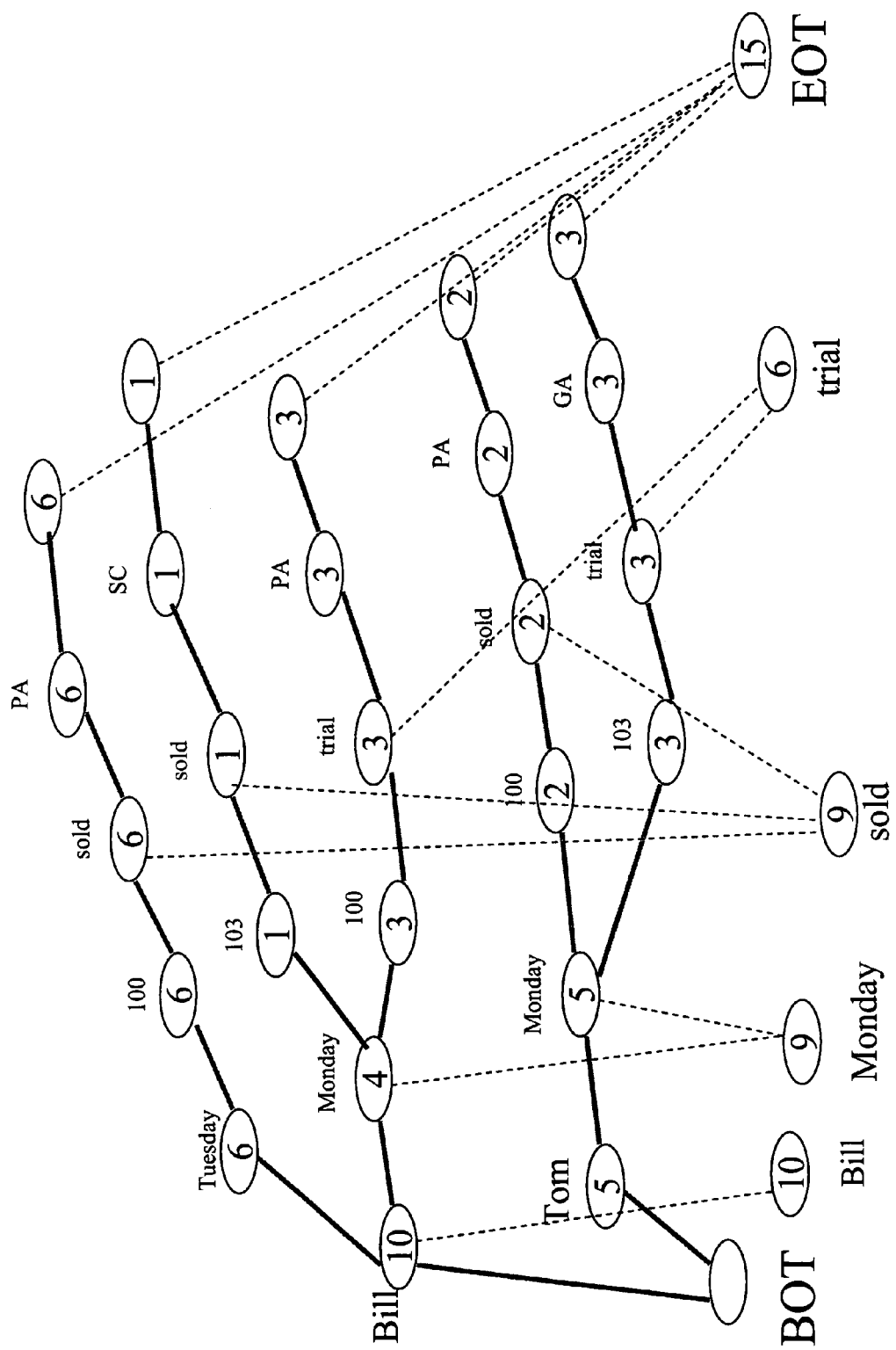
FIG. 7 is a block diagram of nodes in an interlocking trees datastore (KStore) useful for illustration example purposes.

There is an infinite range of groupings possible, but we will start with a description of a basic one for example purposes, and, for ease of illustration and understanding, use a K with its data tabularized. The data set consists of 15 records, composed of 5 fields. These example records are:

Bill Tuesday 100 sold PA
Bill Tuesday 100 sold PA
Bill Tuesday 100 sold PA
Bill Tuesday 100 sold PA
Bill Tuesday 100 sold PA
Bill Tuesday 100 sold PA
Bill Monday 103 sold SC
Bill Monday 100 trial PA
Bill Monday 100 trial PA
Bill Monday 100 trial PA
Tom Monday 100 sold PA Tom Monday 100 sold PA
Tom Monday 103 trial GA
Tom Monday 103 trial GA
Tom Monday 103 trial GA Refer to FIG. 7, which is a representation of the above records in a KStore data structure (interlocking trees data store). Note that the actual KStore will be in a memory of a computer system and the links will all be pointers, and the nodes will not contain any data or strings, the strings are shown over the nodes to make the KStore perceptible to the reader. Here the number of occurrences of each is shown in a node oval.

Because aggregation parameters, such as field variable groupings are actually user-defined, they do not appear in the diagram representation of a KStore. One such user-defined group might be "Area" where geographic areas of the United States might be defined as "East," "West," North," and "South." It should be noted that a user may further constrain the data by nesting field groups within other field groups. For example, such nested user-defined groups within the "Area" field group might be "East" and "South," where states such as NJ, NY, and PA are grouped into "East" and "SC" and "GA" are grouped into "South."

Thus if we were constrained to find the number of "Sold" records for the grouping "East," the answer is in the "Sold" node on those records that include NJ, NY, or PA. In this example there are eight such records. Note that this is done without reference to any tables, without having to characterize or reorganize the data, and without having to recompile any data or any subset thereof to get these kinds of answers.

In a preferred embodiment FIG. 1 aggregation parameters are defined in an application 501 or on a GUI screen 503 and processed by the Data Aggregation analytic 508. In this present embodiment, the aggregation parameters are groupings of field data variables consistent with the data recorded in the KStore being used. These parameters are passed through the Data Aggregation user interface 503 and to the Data Aggregation analytic 508 via a stream 502, 507 of XML (eXtensible Markup Language.) However, it is important to note that the field group information may be created using any programming tool and communicated using any communication protocol or by referencing a common repository such as an internal K value. What the Data Aggregation user interface and analytic use are the information about the field groups, field group values, or attributes.

Define the Set of Queries

The second step in the process is for a user to define a query 522 or a set of queries using the Data Aggregation user interface. These queries will be processing the data in a KStore structure in accordance with data groupings defined by the data aggregation parameters. Also, these queries may be processed on a static KStore, a KStore that is not learning, or a dynamic (real time) KStore, a KStore that is continuing to learn.

A Data Aggregation query is structured in a unique way to enable the Data Aggregation analytic to process the aggregation parameters, locate the data within the KStore's forest of interconnected trees, constrain the records, and process the summations (or other analytic computation as the case may be). The Data Aggregation analytic uses the knowledge recorded by the KStore Engine in the KStore structure and implements special scripts that capitalize on this information. Different from the prior art, KStore analytics use information contained within the KStore structure, such as the number of occurrences of a variable and the relationship of that variable with the rest of the data in the data store and do not require additional data structures such as tables and indexes to be constructed or maintained.

Although we demonstrate only a single analytic, that is, a sum analytic, we also mention the distinct count analytic, and note that there are numerous others. We are not foreclosing the use of any other analytic with this invention, many of which we are currently developing, and some of which are versions of commonly known analytics used for Business Intelligence, Data Mining, or statistical data analysis projects. Such analytics commonly go by names such as Bayesian Classification analysis, decision trees, multivariate analysis, association rules, market basket, and so on.

Building a Query

Figure 3:
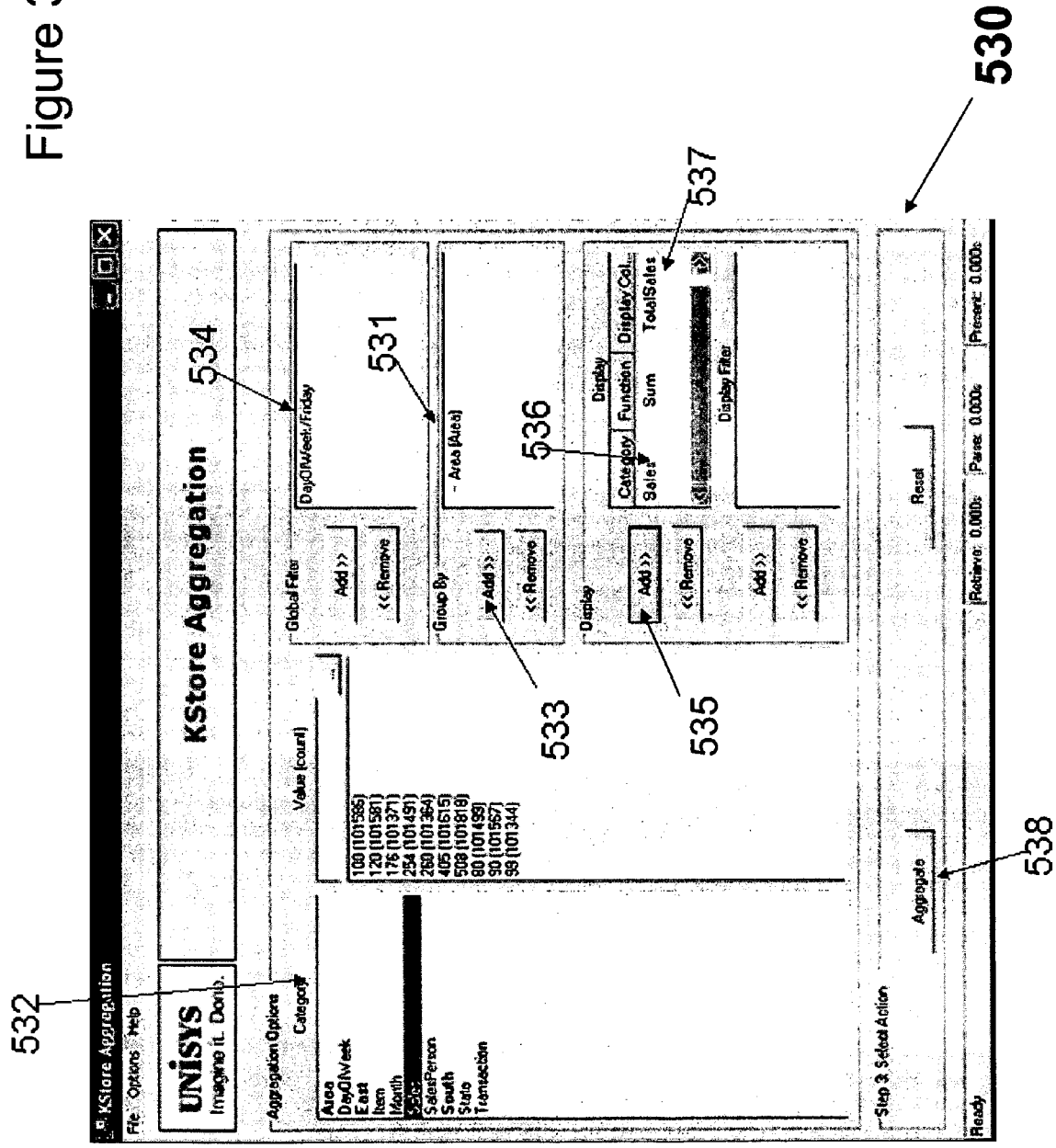
FIG. 3 is a diagram illustrating a screen shot of a KStore Aggregation user interface in accord with preferred embodiments of the invention, taken afterfield groups have been loaded, through which a user is able to build a query.

Refer to FIG. 3. FIG. 3 shows a screen shot of a preferred embodiment KStore Aggregation user interface 530. After loading the field group parameters, the user builds a query that identifies on what field groups, field names, and for what values he wants a summation calculation to be performed. In screen shot 530 the user has identified that he wants the summation calculations performed on the field group "Area" 531. He has done this by selecting the "Area" field group from the "Category" box 532 and pressing the "Add" button 533. The user is telling KStore Aggregation to constrain or "group by" the data as defined in the field group "Area," including both of its components the "East" and "South" field groups and their associated values (the specific states that have been identified as part of the "East" Area field group and the "South" Area field group).

In effect, the components in the channel 509, 510 of FIG. 1, will be responding to this user activity by constraining the KStore to paths that have nodes that represent "South" and "East," in a manner consistent to applying constraints to a KStore as published in U.S. patent application Ser. No. 10/666,382. This may be accomplished by maintaining a list of end product pointers that identify the paths. The end pointer list is modified based on the constraints supplied by the user activity.

The user may also apply a global filter on the field group. A global filter defines a sub-set of the original record set, as a base. In effect, this adds an additional layer of constraint to the aggregation analytic processes. In FIG. 3, the user wants to see only the Friday sales, so he created a global filter "DayofWeek/Friday" as shown in the "Global Filter" box 534.

This is consistent with the concept of further determining a context as also defined in published U.S. patent application Ser. No. 10/666,382 (which has US Publication number 20050076011).

The user may also identify which field name contains the values he wants the summation calculation to be performed on for the selected field group ("Area"). To do this the user selects the numeric field, which can be summed, from those data fields in the Category box 532. In this example the user selects to sum sales for Fridays within the East and South "Areas." He does this by selecting "sales" in the "Category" box 532 and pressing the "Add" button 535. The "Display" 536 reflects that the user has chosen, for the "Category" "Sales," to perform the function: "Sum." The last column "Display Column" is a user-defined field that is used to identify what is being calculated. The results will be stored in a column with the same name as the display column. In this example, the "Display Column" for the "Category" "Sales" displays "Total Sales" 537. Thus, the count of Friday's sales records within this context will be determined in accord with the description of how a focus is identified within each K path, in published U.S. patent application Ser.

No. 10/666,382, referenced above. If the value of the focus is required, as it is for a sum analytic, the value may be reconstructed from the sensor nodes as described in US Patent application No. 10,385,421, published as 20040181547. Then the summation is the selected analytic, and the sum is produced based on the data from the constrained and focused part of the KStore being queried, yielding the result desired.

Figure 4:
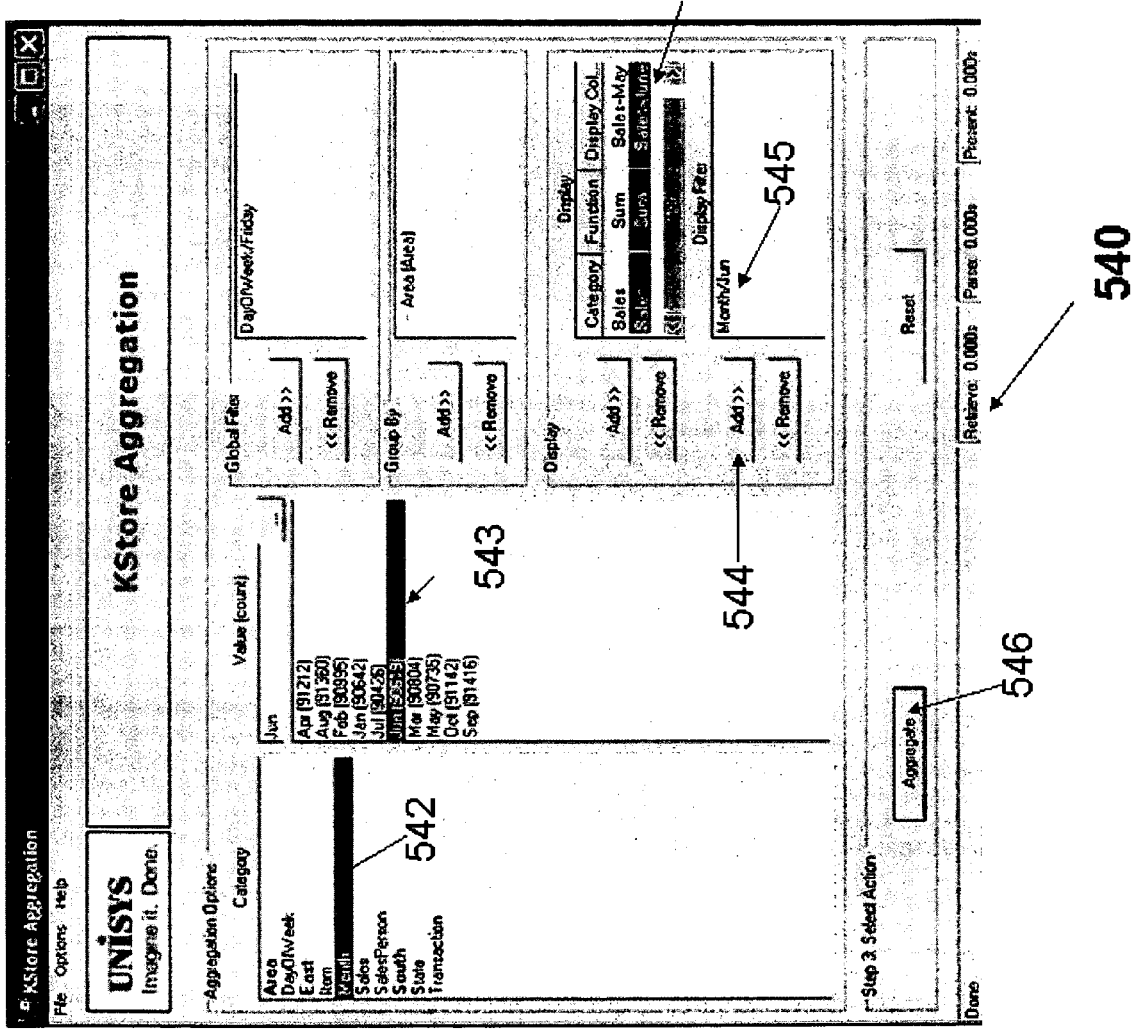
FIG. 4 is a diagram illustrating a screen shot of a KStore Aggregation user interface in accord with preferred embodiments of the invention, taken after additional constraints have been applied.

Refer to FIG. 4. FIG. 4 shows a screen shot of the KStore Aggregation user interface 540 after additional constraints have been applied.

The user can further constrain the data for a particular display category by adding a "display filter." In this example, the user wants to see Friday sales (for the same areas as above) but only for the months June and July of the given year. To do this the user selects a display row such as 541. The user then selects the category "Month" 542 and the month to associate with the given display row—in this example, it is "Jun: 543. The user then presses the Add button 544 and the filter "Month/Jun" displays 545.

In this example, the user has built two queries; one will calculate the total number of sales for the field group "Area" (East and South) for Fridays in May, and another similar one for June.

Before explaining what happens when the user presses the "Aggregate" button 546, we will explain how queries are structured to take advantage of the KStore's unique data structure.

The Structure of a Query

For the aggregation analytic to process a query, it is laid out in a structure that recognizable by the KStore system, which supplies the elements of the query to the KStore through the K Engine. As the user defines the query, the query is built. The structure of the query consists of two components: Field Group Definitions and Processing Directives. Each is discussed below.

Field Group Definitions

The field groups, which may be created using either KStore tools or other software, are transmitted to the Data Aggregation analytic via XML (or some other communication protocol,) and are an early component of the query.

For every field group record that comes into the Data Aggregation analytic, there is a field name and field value pair. Conceptually, as this data comes into the analytic, a table is constructed that contains the data for field group each record. FIG. 5 is an illustration of the data in this conceptual table.

Refer to FIG. 5. FIG. 5 shows the contents of a preferred embodiment conceptual table of data 550, which is built on which to run the Data Aggregation analytic. The column identified as "Field Group" contains the name of the user-defined field grouping. In effect in this example, the user has identified a field group called "Area" and given it two separate values, "East" and "South."

The second column is the "Field Type" column. There are three field type options: "Field Group", "K," and a "Mask." The "Field Group" option tells the analytic that the incoming data has been grouped into a user-defined category and must be treated as a group within a group.

The "K" option indicates that the field name/field value pair represents only one field name/field value in the KStore data structure. Table 555 in FIG. 5 shows the contents of another conceptual table with the field group of "East," which as was explained, is a nested field group within the field group "Area." In this table, "East" field group has a field type of "K" with the field name "States" and field values "NY" and another of "NJ."

The "Mask" option indicates that the field name/field value pair may represent more than one field name/field value in the KStore data structure. In a preferred embodiment, the masking directive may be the computational "regular expression," which is commonly known as a wildcard (*). For example, fora zip code, the "mask" value would be a portion of the zip code and an asterisk (*), or 19*. This tells the analytic to include "all" zip codes that begin with the digits "19". Other masking options are described in our U.S. patent application Ser. No. 11/132,490 filed May 19, 2005 and entitled Variable Masking, incorporated herein by reference for background on masks.

The third column is the "Field Name" that identifies the field within the field group. The fourth column identifies the field value, as explained above. The fifth and sixth columns identify any associated attributes and attribute values for the field group. Attributes allow filtering of fields within a field group.

Processing Directives

A query is also composed of the processing directives, or a command telling the analytic how to process the field group definitions and global filter constraints that are associated with the query. In effect, it is telling the analytic what to do with the data coming in.

There are currently three preferred embodiment processing command directives: the "Global Filter Commands," "Group By" groupings and the "Display Directives."

Global Filter Commands

The global filter commands define the sub-set of the records to consider. These commands tell the analytic what data to filter out and which data to process. In effect, these commands act to constrain the data in the K that are processed. For example, in our explanation of building a query, we created a global filter "DayofWeek" with the constraint "Friday."

The Global Filter Command has three options: Field Name, Field Type, and Field Value.

The Field Name is simply the name of the field on which to constrain the data.

The Field Type option tells the analytic how to interpret the meaning of the field name and the field value. There are four ways that the field type can be used, each identified by a separate command option.

The first field type command option is "K," which tells the analytic to interpret the field name as exactly whatever appears in the field name and the field value as whatever appears in the field value field.

The second field type command option is "mask." The "Mask" option indicates that the field name/field value pair may represent more than one field nametfield value in the KStore data structure. In a preferred embodiment, the masking directive may be the computational "regular expression," which is commonly known as a wildcard (*). For example, for a zip code, the "mask" value would be a portion of the zip code and an asterisk (*), or 19*. This tells the analytic to include "all" zip codes that begin with the digits "19". Other masking options are described in the aforementioned our U.S. patent application Ser. No. 11/132,490 filed May 19, 2005 and entitled Variable.

The third field type command option is "field group." A field grouping is a constraint set having a user defined logical relation between them. In FIG. 3, the example of the screen shot 530 contains the field group "Area" in the "Category" box 532. If used, field groups may be created using KStore tools, but are not limited to that mechanism. Programmers with knowledge of file construction could develop other methods and tools to create field groups.

When the field type is set to "Field Group" this tells the analytic to ignore whatever appears in the field name field and to interpret the field value as the field group name.

The fourth field type is "attribute." If the field type is set to "attribute," this tells the analytic to interpret the attribute name as whateverappears as the field name and the attribute value as whatever appears in the field value field. Attributes allow filtering of fields within a field group.

Group by Commands

The "Group By" Command tells the analytic how to process the field group definitions and the global filters that were defined by the user when the query is constructed.

The preferred embodiment "Group By" Command has the same options as the Global Filter Commands, with one additional option: Field Name, Field Value, Field Type, and display name. Refer to the explanation of each option under Global Filter Commands above.

There are two components of process "Group Bys." The first is that the analytic will attempt to resolve the "group by" items and the second is thatthe analytic will attempt to resolve the constraints associated with the group by items.

Resolving "Group by" Items

If the query contains "Group By" items, the analytic will look up in the field group definitions all of the immediate values within the field group. For example, fora field group called "Area," the analytic will look up all the values within the data layout that are within the "Area" field group, in this example that might be two user-defined values: "East" and "South." In effect, the analytic must first identify the data set on which to perform the aggregation and calculation.

Resolving Constraints

The second component of processing "Group By" items is to resolve the constraints within the field group. The constraints are applied in addition to the global filters for that field group item. When processing actually occurs, the smallest constraints are preferably applied first.

Display Directives

The next type of processing directive is the display directive. In a preferred embodiment there may be one display directive, "sum," however, there are no limitations on the number of additional analytic directives such as averaging, distinct count, distinct count percentage, distinct count ratio, record count, record count percentage, record count ratio, among others, that may be used.

Refer back to FIG. 3. FIG. 3 is a screen shot of the Data Aggregation user interface 530. The display directives are defined by the user in the "Display" area 536 of the Data Aggregation screen 530. The user identifies the "Category" on which to perform a summation calculation. For example, "Sales" 536 (or total number of sales) is the numeric category on which the user wants to perform the calculation. In effect, the query being built is saying that the user wants the analytic to calculate the total sales for each item in the "Area" field group 531 and have it constrained by the global filters "Day of the Week/Friday" 534.

The user may further constrain what will be summed by adding filters to the categories as explained in the previous discussion on building queries.

Still referring to FIG. 3, once the user has defined the collection of query parameters he seeks, he presses the "Aggregation" button 538. Upon doing this, the field group definitions, the global filter commands, and the processing directives are passed to the Data Aggregation Analytic.

It should be noted that this could all be done automatically by a software process, which itself does an aggregation when it has all the other information for defining query parameters by simply calling the process that a user calls by pressing the button 538.

Run Aggregation Analytic

The third step in the overall Data Aggregation process flow 520 is to run the Aggregation Analytic against the KStore data structure 523.

The Aggregation Analytic process is preferably composed of the following: optionally build internal "K," determine type of analytic, constrain records based on global filters, build output records, and output query response.

Build Internal K of Field Groups

First the Data Aggregation analytic reads the field group records that, in this discussion are input in XML format from the Data Aggregation user interface. It is important to note, as mentioned above, that XML is only one way to transmit data within Data Aggregation and that other formats and input means could be used. The Data Aggregation analytic then converts the records to KStore defined records, and builds a temporary K. The temporary K is preferably built in the exactway that primary K is built by invoking the "Learn" utility previously referred to in U.S. patent application Ser. Nos. 10/385,421. In our following example we use the field group "Area" which contains both "South" and "East" defined by zip code records.

Of course, this build step can be skipped if the temporary K is already built from some previous processing.

Determine Type of Analytic to Perform

Second, the type of analytic is parsed from the data set returned from the Data Aggregation user interface. In our example it is the analytic "Sum". As mentioned previously, forthis current patent, the SUM function is the only mathematical function implemented in Data Aggregation, but as mentioned earlier, other possible functions can be created, such as averaging, distinct count, distinct count percentage, distinct count ratio, record count, record count percentage, record count ratio, among others. Also note that the user can opt to just aggregate data and not perform any type of mathematical function, or even to display it in some particular manner that makes the information easier to see or use.

Constrain Records Based on Global Filters

Third, the Data Aggregation analytic continues to read the data returned from the Data Aggregation user interface an item at a time and builds "Group By" lists used to perform the analytic against. Each "Group By" list is a list of all permutations of "Group By" items constrained by the Global Filters if they exist. The "Group By" list is used to traverse the K and the analytic is performed against the set of records defined in the "Group By" list.

Build Output Records

Fourth, the response to data aggregation is constructed in the format of a result summary record. These records are used to build output responses for data aggregation, may be stored, as in a file, directed to a different or entirely new K (interlocking data structure), or directed to a charting application. These records may also be output to a standard record processing application, such as a spreadsheet, for further analysis.

Output Query Response

Fifth, the results of the query are output to the user 524 as shown in the process flow 520. In our example, the response to the query is automatically displayed in the KStore Record Explorer 560. However, it may also be displayed, charted, or stored in a simple file format to disk.

Figure 6:
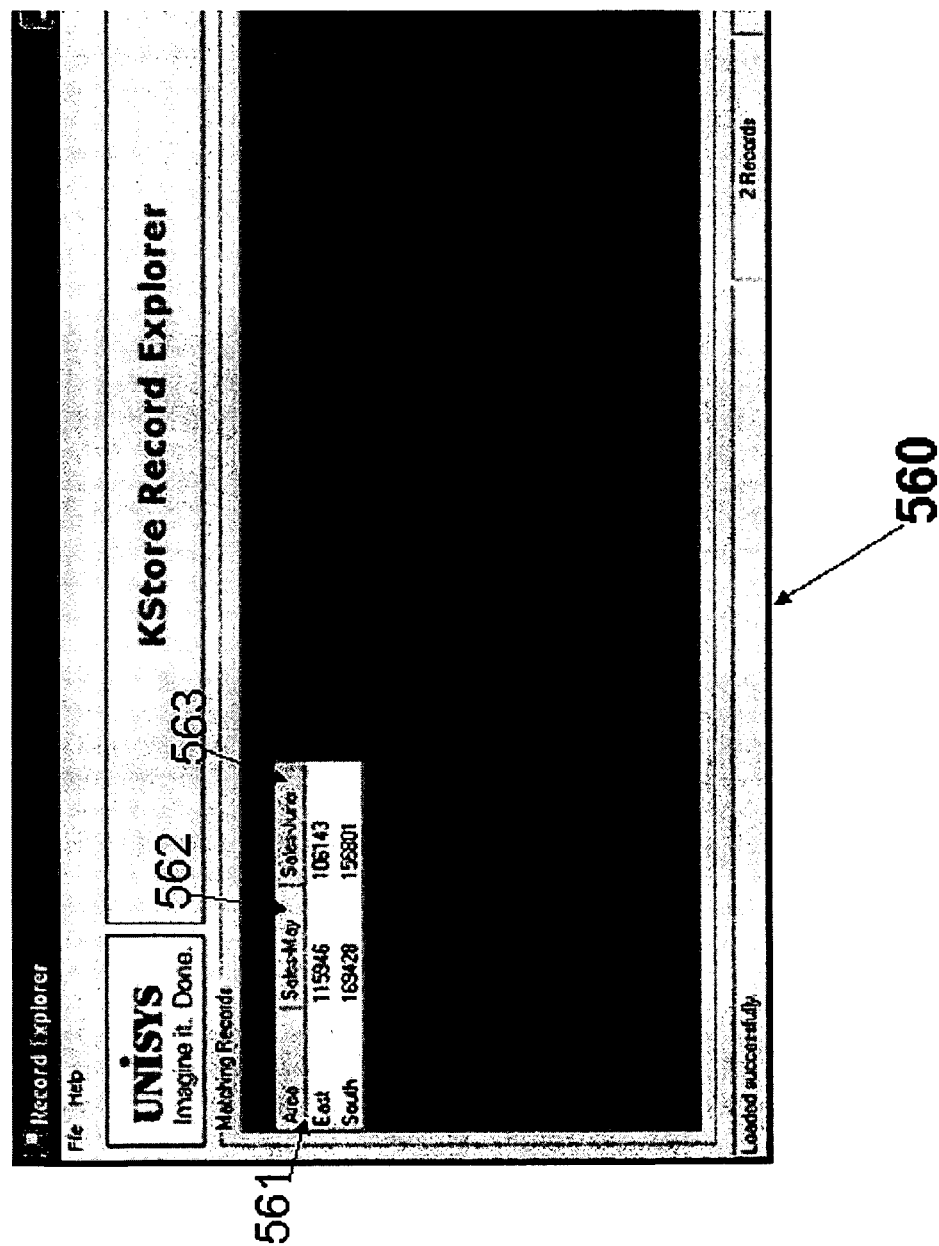
FIG. 6 is an illustration of a screen shot of a standard output form for use with a preferred embodiment of the inventions.

Refer to FIG. 6. FIG. 6 shows a screen shot of a standard output form, KStore Record Explorer 560. All selected display items are constrained by the "Group By" list which is "Area" 561. The user defines the columns where Display Category is "Sales" and a display filter is Sales-May 562 and Sales-June 563 respectively, and the analytic is "Sum". Of course, this data could be displayed graphically, simply by running the data values through a graphics display program, or could be stored into a database, or used as values to trigger other programs and the like, but we are only describing the general process here so this simple display is appropriate for this explanation.

CONCLUSION

Generally then, Once the group data is passed to the Data Aggregation user interface, the user is able to define the global filters (constraints), the directives by which to group and the directives by which to calculate.

Once the query is built, it can be sent to a chosen or predetermined Data Aggregation analytic within the K Server. The K Server receives the filters, field group definitions, aggregation directives, and sum directives in XML. The Data Aggregation analytic processes the aggregation and returns the resulting summary records, in XML and/or redirects the output to another K. The results, in tabular format, contain only the constrained information and a total sum of the mathematical fields identified. In one preferred embodiment, the calculations that can be performed include mathematical summation (the sum of one or many values). Other versions of Data Aggregation may allow performing other mathematical calculations (such as averaging).

Once the analytics are performed, the KStore Record Explorer displays the results table (including the column headings of the field groups and the associated calculated (summed) fields.

Believing that the invention has been fully described above in sufficient detail to enable those of ordinary skill in these arts to make and use the same, the scope of this invention is limited only by the following claims.

We claim:

1. A computer implemented method for obtaining desired information from an interlocking trees datastore comprising:
    establishing aggregation parameters from received input,
    traversing said interlocking trees datastore comprising elemental root nodes, subcomponent nodes and end-product nodes using asCase and asResult bidirectional links for determining paths within the interlocking trees datastore structure, with said established aggregation parameters so as to establish a set of paths within said interlocking trees datastore in accord with said established aggregation parameters,
    wherein said interlocking trees data store has already recorded a collection of data such that relationships of said collection of data are modeled by said interlocking trees datastore, said interlocking trees datastore situated within memory accessible to a process running in a computer, said interlocking trees datastore comprising a structured collection of nodes connected by links of said nodes having pointers to other nodes of said interlocking trees datastore, wherein said nodes containing a count field, said nodes including at least nominally different kinds of nodes, a first kind called root nodes of which there are at least one primary root node and at least one elemental root node and which may include other root nodes, a second kind of node called an end of thought (EOT) node, at least one node of a third kind of node called a subcomponent node, and at least one node of a kind of node called an end product node, and wherein there exist at least two kinds of said links, Result and Case links, wherein said Result links point between a one of said root nodes and any other node, and wherein said bi-directional Result links point between a Result field of one node and an asResult list of another node, and wherein said bi-directional Case links point between the Case field of one node and an asCase list of another node.

2. A computer implemented method as set forth in claim 1 for obtaining desired information from a collection of data further comprising:
    building an interlocking trees datastore via a Learn Engine reading data from a selected data set, and recording the relationships within said data set into said interlocking trees datastore.

3. The method of claim 1 further comprising, determining an analytic to apply to said set of K paths of said dataset, and, applying said analytic to said established set of K paths in said interlocking trees datastore to produce results.

4. The method of claim 3 wherein the results are in the form of an aggregated data set.

5. The method of claim 4 wherein the results are produced in the form of a set of summary records.

6. The method of claim 5 wherein the set of summary records is produced in an XML format.

7. The method of claim 3 wherein the results are a set of K paths.

8. The method of claim 3 further comprising displaying said results.

9. The method of claim 8 wherein said displaying of said results is accomplished via a printout or a visual display screen having displayed thereon at least a report, chart, graph, grouping spreadsheet or other visually perceptible image related to the results.

10. The method of claim 3 wherein said analytic is applied only to specific fields of nodes in said established set of K paths in said interlocking trees datastore.

11. The method of claim 3 wherein said established set of K paths contain nodes that contain at least count fields.

12. The method of claim 11 wherein said analytic is applied to the value of the counts in the count fields.

13. The method of claim 10 wherein at least one of said specific fields is a variable field, and wherein values of said variable are used by said analytic to produce said results.

14. The method of claim 13 wherein obtaining said values of said variable is accomplished through
    identifying any field variables needed to satisfy the fields,
    traversing said interlocking trees datastore to root nodes having values for said identified any field variables, and
    constructing variables from variable fields in said root nodes having said values.

15. The method of claim 14 wherein said constructed variables are summed.

16. The method of claim 3 wherein said analytic is at least one of a set of selectable analytics from the group comprising:
    sum, average, distinct count, distinct count percentage, distinct count ratio, record count, record count percentage, record count ratio, probability, Bayesian Classification analysis, decision tree, inultivariate analysis, association rules, market basket.

17. The method of claim 3 wherein the analytic is a form of analytic commonly used for Business Intelligence, Data Mining, or statistical data analysis projects.

18. A computer system having software and hardware therein which when operating in said computer system:
    establishes aggregation parameters from received input, traverses an interlocking trees datastore comprising elemental root nodes, subcomponent nodes and end-product nodes using asCase and asResult bidirectional links for determining paths within the interlocking trees datastore structure, with said established aggregation parameters so as to establish a set of paths within said interlocking trees datastore in accord with said established aggregation parameters, wherein said interlocking trees data store has already recorded a collection of data such that relationships of said collection of data are modeled by said interlocking trees datastore, said interlocking trees datastore situated within memory accessible to a process running in a computer, said interlocking trees datastore comprising a structured collection of nodes connected by links of said nodes having pointers to other nodes of said interlocking trees datastore, wherein said nodes containing a count field, said nodes including at least nominally different kinds of nodes, a first kind called root nodes of which there are at least one primary root node and at least one elemental root node and which may include other root nodes, a second kind of node called an end of thought (EOT) node, at least one node of a third kind of node called a subcomponent node, and at least one node of a kind of node called an end product node, and wherein there exist at least two kinds of said links, Result and Case links, wherein said Result links point between a one of said root nodes and any other node, and wherein said bi-directional Result links point between a Result field of one node and an asResult list of another node, and wherein said bi-directional Case links point between the Case field of one node and an asCase list of another node.

* * * * *